United States Patent
Christian

(10) Patent No.: US 9,592,763 B2
(45) Date of Patent: Mar. 14, 2017

(54) VEHICULAR SAFETY ASSISTIVE DEVICE

(71) Applicant: SAFELY BRAKE, INC., Fort Wayne, IN (US)

(72) Inventor: Ron Christian, Glendale, AZ (US)

(73) Assignee: SAFELY BRAKE, INC., Fort Wayne, IN (US)

( * ) Notice: Subject to any disclaimer, the term of this patent is extended or adjusted under 35 U.S.C. 154(b) by 0 days.

(21) Appl. No.: 14/275,864

(22) Filed: May 12, 2014

(65) Prior Publication Data

US 2014/0333426 A1 Nov. 13, 2014

Related U.S. Application Data

(60) Provisional application No. 61/822,741, filed on May 13, 2013.

(51) Int. Cl.
*B60Q 1/44* (2006.01)

(52) U.S. Cl.
CPC ............ *B60Q 1/44* (2013.01); *B60Q 2900/10* (2013.01)

(58) Field of Classification Search
CPC ........................ B60Q 1/44–1/448; B60Q 1/302
USPC ......... 340/479; 315/77, 80; 362/487; 701/70
See application file for complete search history.

(56) References Cited

U.S. PATENT DOCUMENTS

| | | | |
|---|---|---|---|
| 3,576,527 A | 4/1971 | Howard | |
| 3,740,715 A | 6/1973 | Szekessy | |
| 3,760,353 A | 9/1973 | Hassinger | |
| 3,846,749 A | 11/1974 | Curry | |
| 3,914,739 A | 10/1975 | Caughlin et al. | |
| 4,403,210 A | 9/1983 | Sullivan | |
| 4,651,129 A | 3/1987 | Wood et al. | |
| 4,876,525 A | 10/1989 | Gross | |
| 4,956,633 A | 9/1990 | Waterson et al. | |
| 4,983,952 A | 1/1991 | Athalye | |
| 4,987,405 A | 1/1991 | Jakobowski | |
| 5,001,398 A * | 3/1991 | Dunn | 315/77 |
| 5,028,908 A | 7/1991 | Juang | |
| 5,172,095 A | 12/1992 | Scott | |
| 5,231,373 A * | 7/1993 | Freeman et al. | 340/479 |
| 5,345,218 A | 9/1994 | Woods et al. | |
| 5,404,130 A | 4/1995 | Lee et al. | |
| 5,442,333 A | 8/1995 | Bailey | |
| 5,565,841 A | 10/1996 | Pandohie | |
| 5,606,310 A | 2/1997 | Egger et al. | |
| 5,677,670 A | 10/1997 | Gangloff | |
| 5,847,513 A | 12/1998 | Host | |
| 5,909,174 A | 6/1999 | Dietz et al. | |
| 6,025,775 A * | 2/2000 | Erlandson | 340/479 |
| 6,111,500 A * | 8/2000 | Wilson | 340/479 |
| 6,160,476 A | 12/2000 | Ponziani | |
| 6,175,305 B1 | 1/2001 | Johnson et al. | |

(Continued)

*Primary Examiner* — Thomas Mullen
(74) *Attorney, Agent, or Firm* — Faegre Baker Daniels LLP

(57) ABSTRACT

A vehicular safety device that couples between a vehicular brake light and the vehicle's brake pedal switch, having logic responsive to each activation of the brake pedal switch to initiate an illumination pattern of a plurality of periods of various output intensity and duration of the brake light. Sequential period durations and intensities may be unequal, respectively, to their predecessors. Period durations and intensities may be uncorrelated. Sequential illumination patterns may not be identical. Illumination patterns are preferably less than five seconds long.

3 Claims, 5 Drawing Sheets

(56) References Cited

U.S. PATENT DOCUMENTS

| | | |
|---|---|---|
| 6,693,526 B1 | 2/2004 | Puccio |
| 6,710,709 B1 | 3/2004 | Morin et al. |
| 6,720,871 B2 | 4/2004 | Boyer et al. |
| 6,744,361 B1 | 6/2004 | Maddox |
| 6,943,677 B2 | 9/2005 | Boyer et al. |
| 2003/0164035 A1* | 9/2003 | Nantz et al. ........ B60C 23/0433 73/146 |
| 2010/0066528 A1 | 3/2010 | Kim |
| 2011/0181197 A1* | 7/2011 | Kanda et al. ................ 315/268 |

* cited by examiner

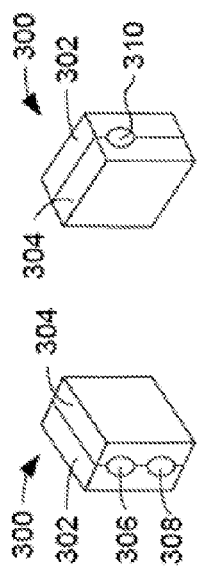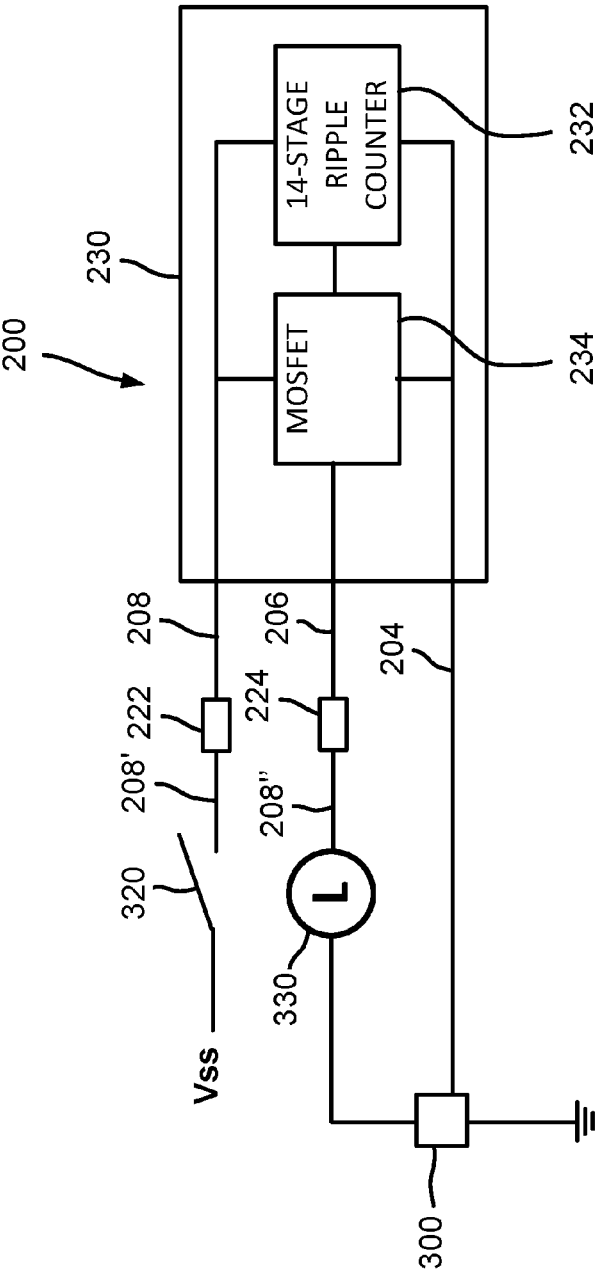
FIG. 3A   FIG. 3B
FIG. 3C

VEHICULAR SAFETY ASSISTIVE DEVICE

CROSS-REFERENCE TO RELATED APPLICATIONS

This application claims the benefit of U.S. Provisional Patent Application Ser. No. 61/822,741 filed May 13, 2013 to the same inventor.

FIELD OF THE INVENTION

This invention relates to an improved novel design for a vehicular safety device for use with center high-mounted stop lamps (CHMSL) (brake lights) for vehicles.

BACKGROUND

Stop lamp flashers of various designs are known in the art. Stop lamp flashers turn a CHMSL on and off rapidly to alert a driver behind a stopping vehicle that the flasher-equipped vehicle is stopping. Persons who frequently drive in stop-and-go city traffic can become less responsive to ordinary brake lights over time, and stop lamp flashers create a more compelling visual image to get the attention of the driver of the rear vehicle. Stop lamp flashers have run into legal problems, because, by virtue of being turned off during part of the cycle, they do not meet federal safety standards for stop lamps (a.k.a. brake lights). Most brake light patents during the years 1971-2004 are for flashers. For example, U.S. Pat. Nos. 3,576,527, 3,760,353, 3,846,749, 3,914,739, 4,403,210, 4,651,129, 4,876,525, 4,956,633, 4,983,952, 4,987,405, 5,028,908, 5,172,095, 5,345,218, 5,404,130, 5,442,333, 5,565,841, 5,606,310, 5,677,670, 5,847,513, 6,160,476, 6,175,305, 6,693,526, and 6,744,361 are for flashers. One document, U.S. Patent Publication No. 2010/0066528, discloses flashers as late as 2010. Flashers are now considered illegal, as safety regulations require the brake light to remain ON while the brake pedal is depressed.

Some commercially available vehicular safety devices do not shut off for part of the cycle, but leave room for improvements is size, production cost, ease of installation, and reliability. The earliest vehicular safety device found is U.S. Pat. No. 3,740,715, which uses modulation of intensity between two illumination states, rather than ON/OFF switching, as with flashers. U.S. Pat. No. 3,740,715 also discloses an inertial sensor as part of the system, which increases cost and complexity. U.S. Pat. Nos. 6,720,871 and 6,943,677 disclose a brake light pulser that has an after-braking delay to prevent repetitive flashing in stop-and-go traffic, which can give the driver observing the CHMSL an inaccurate representation of what the car in front is doing.

Therefore, a need exists for a vehicular safety device that is smaller, cheaper to produce, easier to install, better at getting the attention of other drivers, and more reliable. Further, a need exists for a vehicular safety device that accurately initiates flashing every time the brake pedal is depressed. Further, a need exists for a vehicular safety device that does not require additional sensors and can rely exclusively on the brake light switch already in the vehicle. Further, a need exists for a vehicular safety device that uses only one integrated circuit (IC). Yet even further, there is a need for a vehicular safety device that attaches to the inside of the CHMSL housing to prevent strain on the electrical connections. Yet even further, there is a need for a vehicular safety device that has more than two intensity states. Yet even further, there is a need for packages containing large numbers of vehicular safety devices for sale to car dealerships.

OBJECTS AND FEATURES OF THE INVENTION

A primary object and feature of the present invention is to overcome the above-mentioned problems and fulfill the above-mentioned needs. Another object and feature of the present invention is to provide a vehicular safety device having lower production and marketing costs, higher reliability, and smaller size. It is a further object and feature of the present invention to provide a vehicular safety device that does not require additional sensors and can rely exclusively on the brake light switch already in the vehicle. It is yet a further object and feature of the present invention to provide a vehicular safety device that uses only one integrated circuit (IC). It is a further object and feature of the present invention to provide a vehicular safety device that attaches to the inside of the CHMSL cavity to prevent strain on the electrical connections. It is a further object and feature of the present invention to provide a vehicular safety device that has more than two intensity states. It is yet a further object and feature of the present invention to provide packages containing large numbers of vehicular safety devices for sale to car dealerships.

It is an additional primary object and feature of the present invention to provide such a system that is efficient, inexpensive and handy. Other objects and features of this invention will become apparent with reference to the following descriptions.

SUMMARY OF THE INVENTION

In accordance with a preferred embodiment hereof, this invention provides a vehicular safety device for a center high-mounted stop lamp, the device having a multi-layer substrate that is no greater than 1.2 inches long and no greater than 0.5 inches wide; imprinted using circuit masks on the layers; and having a single CMOS integrated circuit on the substrate, such as a 14-bit ripple counter with internal oscillator. The vehicular safety device optionally has three or more intensity states per illumination pattern, with the duration of each intensity plateau being optionally unequal. In some embodiments, each illumination pattern is different from immediately preceding or immediately following illumination patterns.

BRIEF DESCRIPTION OF THE DRAWINGS

The present invention will hereinafter be described in conjunction with the following drawing figures, wherein like numerals denote like elements, the hundreds digits indicate the drawing where the item is first referenced.

FIGS. 3A and 3B are perspective views of an exemplary ground wire connector for connecting the vehicular safety device to vehicle ground, according to a preferred embodiment of the present invention;

FIG. 3C is a schematic diagram of the vehicular safety device depicted in FIG. 2;

DETAILED DESCRIPTION OF THE BEST MODES AND PREFERRED EMBODIMENTS OF THE INVENTION

Figure 1:
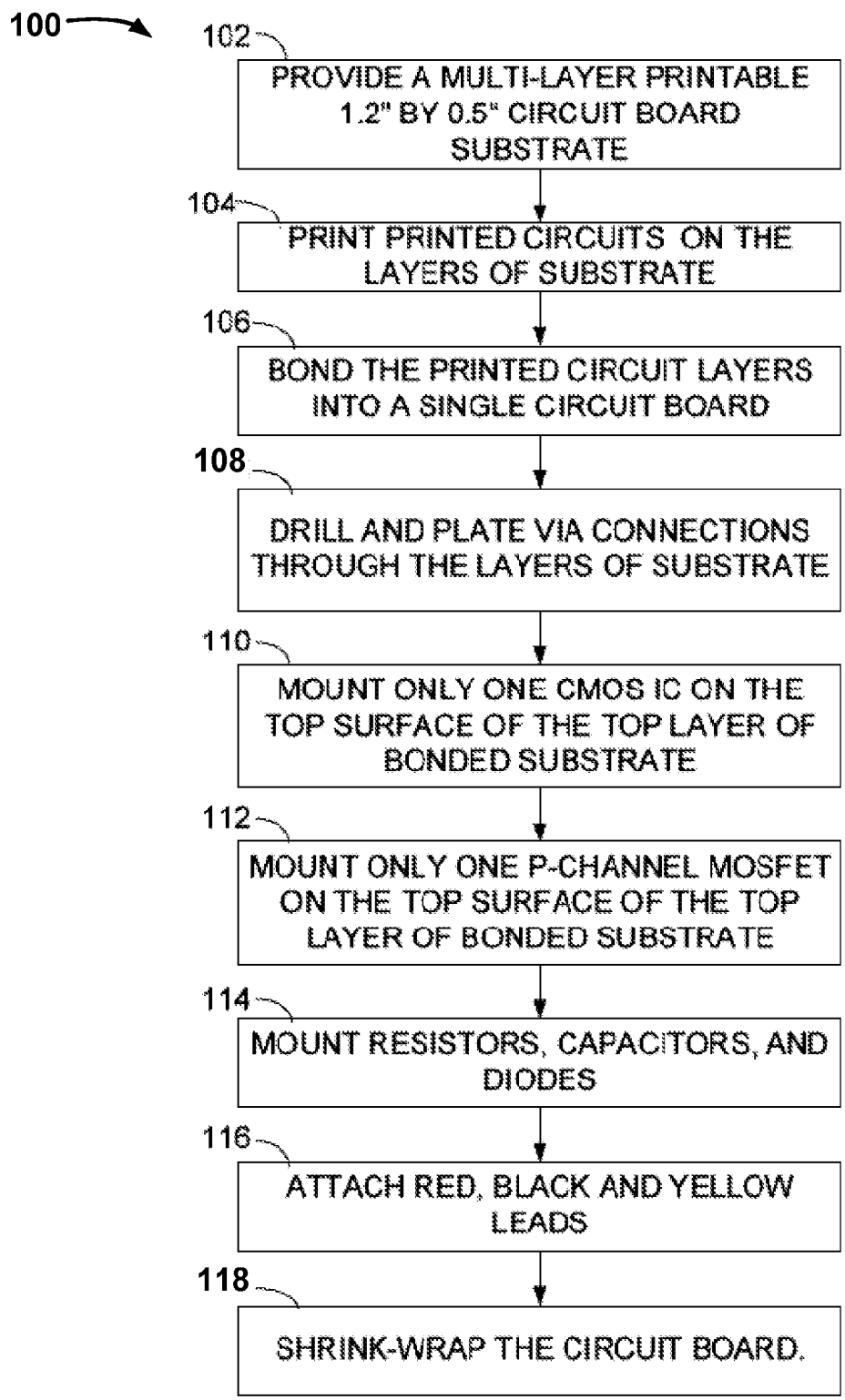
FIG. 1 is a flowchart illustrating an exemplary vehicular safety device production method, according to a preferred embodiment of the present invention.

FIG. 1 is a flowchart 100 illustrating an exemplary method for producing a vehicular safety device 200 (shown in FIG. 2), according to a preferred embodiment of the present invention. The method begins with providing 102 a multi-layer printable circuit board substrate. In a preferred embodiment, the multi-layer printable circuit board is printed 104 as one board and then cut into sections (layers) one-half inch wide and 1.2 inches long. In an alternate embodiment, each layer is separately printed 104. After printing 104 the circuits, the layers are bonded 106, as is known in the art of circuit board manufacture, to form a multi-plane circuit board. Seven vias are then drilled and plated 108 to form inter-plane connections. Once the production of the bare board is complete, components are added to the bare board.

In step 110, only one CMOS IC 232 (shown in FIG. 3C) is mounted on the top surface of the printed circuit board. The CMOS IC is preferably a CD4060BC CMOS IC, which is a 14-stage ripple binary counter IC. In step 112, only one P-Channel MOSFET 234 (shown in FIG. 3C) is mounted on the top surface of the printed circuit board. The MOSFET is preferably a TCP8114. In additional embodiments, other P-channel MOSFETS may be used. In step 114, resistors, capacitors, and diodes are added to the circuit board. Steps 110, 112, and 114 may be performed in any order, or intermixed, or done all at once, or done at once for the top of the circuit board and at once for the bottom of the circuit board.

In various embodiments, minor variations in circuitry to produce various intensity profiles for various illumination patterns is within the scope of the invention.

After the circuitry is completely installed, three leads 208, 206, 204 (shown in FIGS. 2 and 3C) (red, yellow, and black, respectively) are attached to the circuit board and the circuit board is covered 118 with a shrink wrapping.

Figure 2:
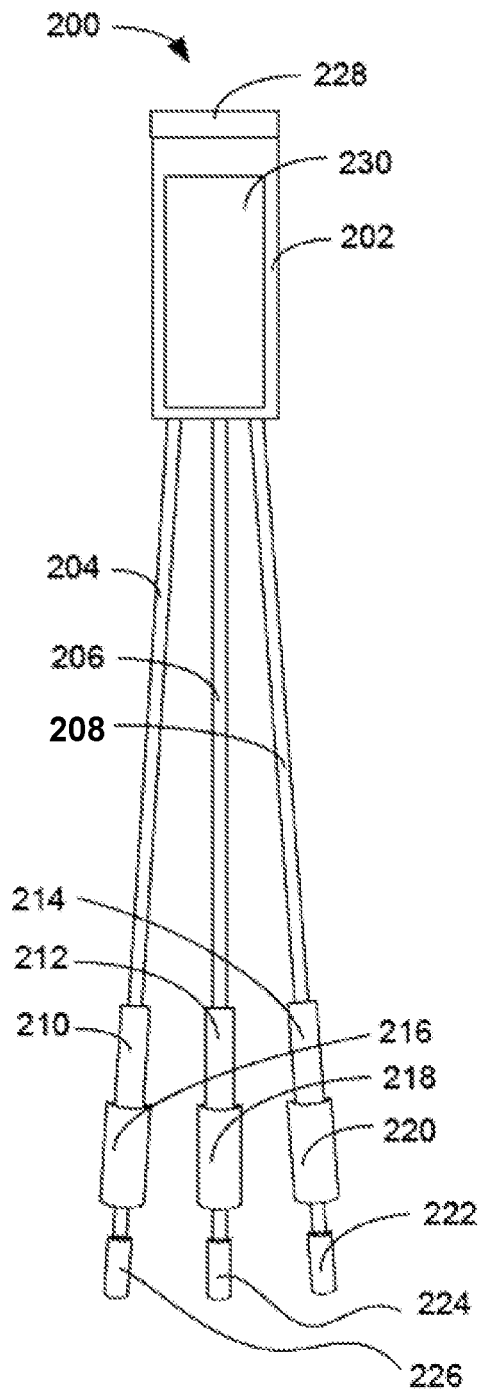
FIG. 2 is a top plan view illustrating an exemplary vehicular safety device, according to a preferred embodiment of the present invention.

FIG. 2 is a diagrammatic view illustrating an exemplary vehicular safety device 200, according to a preferred embodiment of the present invention, produced in accordance with the method described with reference to FIG. 1. Vehicular safety device 200 comprises a circuit board 230 electrically connected to three leads 204, 206, and 208 (black, yellow, and red, respectively) and covered by a shrink wrap 202. Black lead 204 has a crimpable connector 226. A sleeve 210 and a cover 216 slide on black lead 204 to cover at least a portion of the crimped connection after installation. Yellow lead 206 has a crimpable connector 224.

A sleeve 212 and a cover 218 slide on yellow lead 206 to cover at least a portion of the crimped connection after installation. Red lead 208 has a crimpable connector 222. A sleeve 214 and a cover 220 slide on red lead 208 to cover at least a portion of the crimped connection after installation. Vehicular safety device 200 further comprises a coupling portion 228, such as a hook or loop section of a hook and loop fastener, for attaching vehicular safety device 200 to the inside of the vehicle.

FIGS. 3A and 3B are perspective views of an exemplary ground wire connector 300 for connecting vehicular safety device 200 to a ground of the vehicle, according to a preferred embodiment of the present invention. Ground wire connector 300 comprises two sides 302, 304 and clamps 306, 308 and 310 therebetween. Clamps 306 and 308 are shown on FIG. 3A and clamp 310 is shown in FIG. 3B, which depicts an opposite side of the view of exemplary ground wire connector 300 shown in FIG. 3A. The ground wire in the vehicle is severed and the ends are stripped and preferably inserted in clamps 306 and 310. Sides 302 and 304 may open hingedly to facilitate this clamping. Black lead crimpable connector 226 is preferably inserted in clamp 308, giving the black lead 204 an electrical connection to ground. In various embodiments, ground wire connector 300 may be of various types having equivalent functionality.

Figure 4:
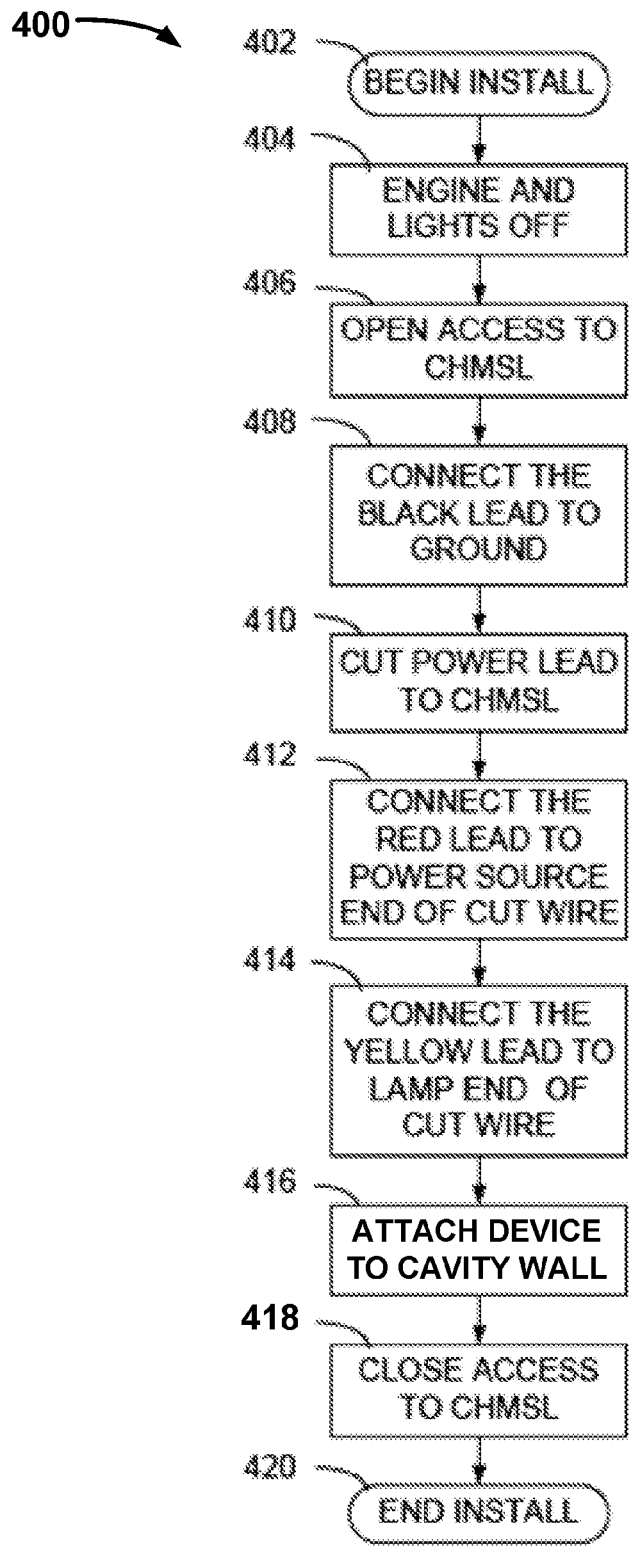
FIG. 4 is a process chart view, illustrating an exemplary installation process for the exemplary vehicular safety device of FIG. 2, according to a preferred embodiment of the present invention.

FIG. 4 is a flowchart illustrating an exemplary process 400 for the installation of vehicular safety device 200, according to a preferred embodiment of the present invention. In step 402, the vehicular safety device 200; the installation instructions; and a wire stripper, wire cutter, and crimper (which three may be the same tool), are gathered together. In step 404, the installer verifies that the engine and lights are off. In step 406, physical access to the CHMSL is obtained. In step 408, the ground wire in the vehicle and within the CHMSL housing is severed and the ends are stripped and inserted in clamps 306 and 310. Sides 302 and 304 may open hingedly to facilitate this clamping. Black lead crimpable connector 226 is inserted in clamp 308, giving the black lead 204 an electrical connection to ground. The power lead (wire) going to and within the CHMSL from the brake switch 320 (shown in FIG. 3C) is severed 410 and the ends stripped and crimpable connector 222 is crimped 412 onto the lead 208' leading to the brake switch 320 and crimpable connector 224 is crimped 414 onto the end of the brake light wire 208" of the brake light 330 (shown in FIG. 3C) within the CHMSL housing and leading to the CHMSL. The vehicular safety device 200 is then attached 416 to a wall or other surface within the vehicle cavity holding the CHMSL using a coupling portion 228 that is either generic, such as hook and loop fasteners, or that is specifically designed for the particular vehicle cavity. Access to the CHMSL housing is closed 418 and the tools put away in step 420.

Figure 5:
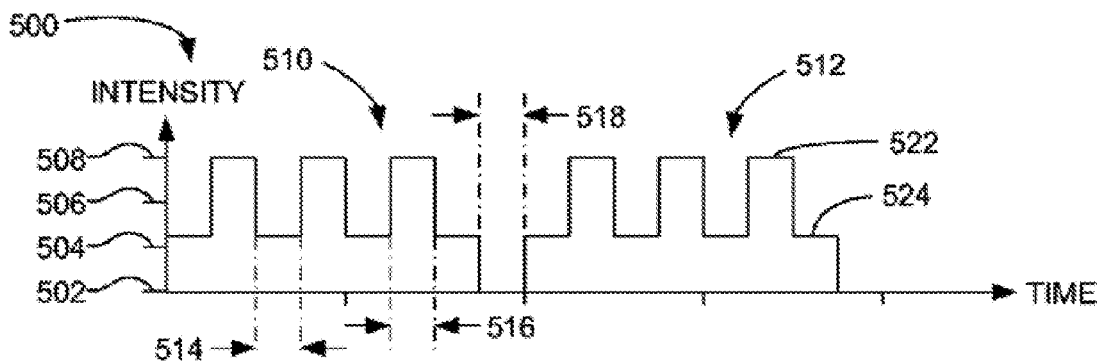
FIG. 5 is a time vs. intensity graph illustrating two exemplary illumination patterns of the exemplary vehicular safety device of FIG. 2, according to a preferred embodiment of the present invention.

FIG. 5 is a time vs. intensity graph 500 illustrating two exemplary illumination patterns 510 and 512 of the exemplary vehicular safety device 200 of FIG. 2, according to a preferred embodiment of the present invention. The output of one embodiment of the vehicular safety device 200 are illumination patterns 510 and 512 of various amounts of power to produce various intensities of light from the CHMSL. Four intensity levels are shown: the highest intensity 508 is the highest intensity at which the CHMSL can be operated. A middle intensity 506, not used in the embodiment graphed in FIG. 5, is above the minimum visible intensity 504 and below the highest intensity 508. The intensity level 502 indicates that the CHMSL is off. As shown, each illumination pattern 510 and 512 consists of three high intensity outputs 522 having periods 516 (one of six labeled) interlaced between lower intensity outputs 524 having periods 514. Each period 514 and 516 must be longer than one-thirtieth of a second and is preferably longer than one-tenth of a second. The lower intensity CHMSL output 524 is preferably slightly higher than the minimum visible level 504, as shown. The higher intensity CHMSL output 522 is preferably equal to the highest intensity level 508, as shown. Each illumination pattern 510 and 512 is separated by an interval 518 that varies depending on the driver's use of the brake pedal. Each illumination pattern 510 and 512 begins when the driver steps on the brake pedal. There is no lockout period, as is common in the prior art, so interval 518 can be thought of as potentially negative, i.e., if the driver pumps the brakes during illumination pattern 510, then illumination pattern 512 will start immediately, replacing the remainder of illumination pattern 510.

In various embodiments, each illumination pattern 510 and 512 may have more or fewer high intensity outputs 522 and more or fewer low intensity outputs 524. In various embodiments, periods 514 and 516 may not be of equal duration. In various embodiments, the illumination pattern 510 or 512 may begin with the higher intensity output 522 rather than the lower intensity output 524.

Figure 6:
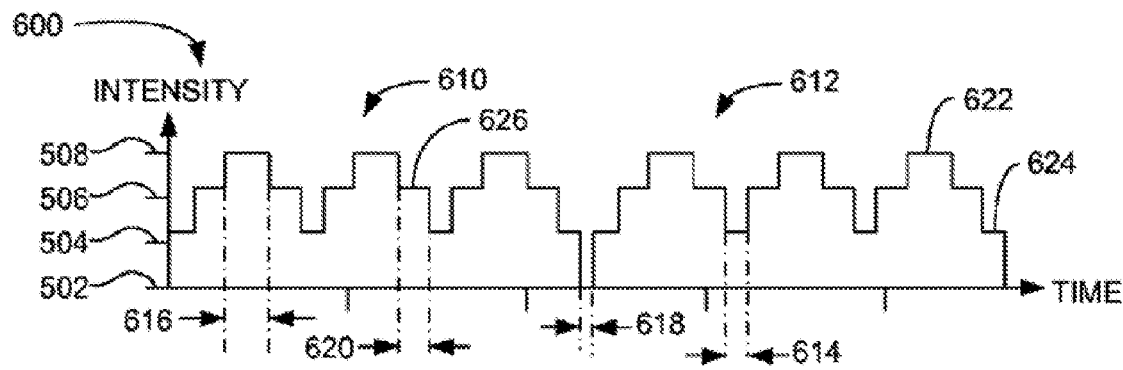
FIG. 6 is a time vs. intensity graph illustrating two exemplary illumination patterns of a second embodiment of the exemplary vehicular safety device of FIG. 2, according to a preferred embodiment of the present invention.

FIG. 6 is a time vs. intensity graph 600 illustrating two exemplary illumination patterns 610 and 612 of a second embodiment of the exemplary vehicular safety device 200 of FIG. 2, according to a preferred embodiment of the present invention. Illumination patterns 610 and 612 use a middle intensity output 626 (one of six labeled) in between high intensity output 622 and low intensity output 624. In this example, high intensity output 622 duration 616 is preferably longer than either the middle intensity output 626 duration 620 or the low intensity output 624 duration 614. Interval 618 between illumination patterns 610 and 612 depends on the driver's use, with the illumination pattern 610 or 612 beginning each time the brake pedal is depressed, regardless of whether or not an earlier illumination pattern is still in progress. While the example of FIG. 6 shows three visible levels of output 622, 624, and 626, the invention is not limited to any particular number of intensity levels, within the constraint that the duration of each intensity output is preferably greater than or equal to one-tenth of a second. One novelty of this embodiment is having more than two visible intensity levels 622, 624, and 626.

Figure 7:
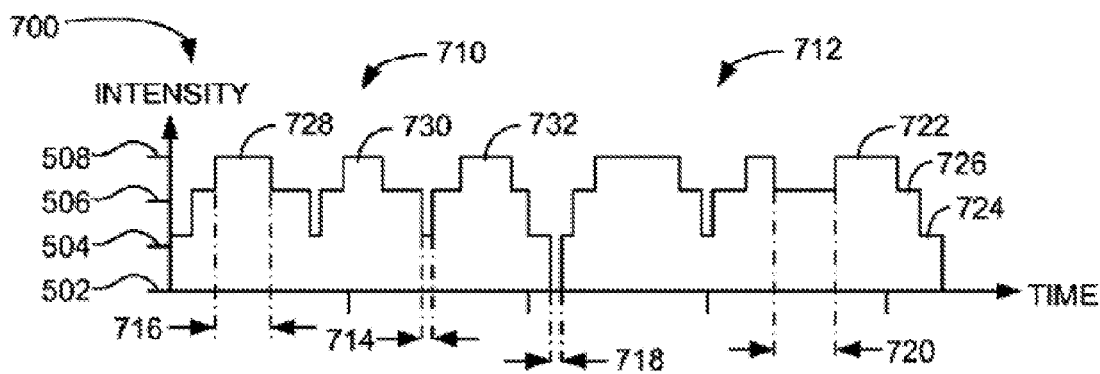
FIG. 7 is a time vs. intensity graph illustrating two exemplary illumination patterns of a third embodiment the exemplary vehicular safety device of FIG. 2, according to a preferred embodiment of the present invention.

FIG. 7 is a time vs. intensity graph illustrating two exemplary illumination patterns 710 and 712 of a third embodiment 700 the exemplary vehicular safety device 200 of FIG. 2, according to a preferred embodiment of the present invention. Like graph 600, graph 700 shows three visible intensity levels: low 724, middle 726, and highest 722. Within a illumination pattern 710, there are three high intensity outputs 728, 730, and 732. High intensity output periods 716 (one of three labeled) are not equal, nor are the middle intensity output periods 720 (one of five in illumination pattern 712 labeled), nor the low intensity output periods 714 (one of four labeled). A novelty of this embodiment is that output periods 716, 714, and 720 may not be equal to each other, giving the light output a distinctive difference from the prior art. Another novel aspect of the invention is that no two sequential illumination patterns 710 and 712 are the same, due to the variation in output periods 716, 714, and 720 in each illumination pattern 710 and 712. Intensities and durations may be uncorrelated. As a result, observing drivers do not get desensitized to the light output, as they do when looking at the same thing over and over again.

Those of skill in the electronic arts, having seen the graphs 500, 600, and 700, will know how to design the circuitry to produce the desired output without undue experimentation. In a particular embodiment, the vehicular safety device may be integrated into a vehicle's electronics system during manufacture.

While the invention has been described in terms of a single exemplary vehicular safety device 200, packaging large numbers of exemplary vehicular safety devices 200 for sale to car dealerships is within the scope of the invention.

I claim:

1. A vehicular safety device for a vehicle having a brake light and a brake switch, the vehicular safety device comprising:
    a 14-stage ripple counter;
    a metal-oxide field effect transistor (MOSFET) coupled to the 14-stage ripple counter;
    a circuit board on which the 14-stage ripple counter and the MOSFET are mounted; and
    wiring adapted to connect the circuit board to the vehicle, the wiring consisting of:
        a first lead to receive power from a power source responsive to each activation of said brake switch, the first lead configured to power the 14-stage ripple counter and the MOSFET and cause the MOSFET to output an illumination pattern signal responsive to each activation of said brake switch,
        a second lead adapted for connection to the brake light to energize the brake light with the illumination pattern signal, and
        a third lead adapted for connection to a ground wire of the vehicle to ground the 14-stage ripple counter and the MOSFET and thereby complete an electrical circuit,
    wherein the illumination pattern comprises a plurality of periods including high intensity periods between low intensity periods.

2. The vehicular safety device of claim 1, wherein each period of said plurality of periods is more than one-tenth of a second in duration.

3. The vehicular safety device of claim 1, wherein the high intensity periods are unequal in duration to the low intensity periods.

* * * * *